(12) United States Patent
Prior et al.

(10) Patent No.: US 10,730,383 B2
(45) Date of Patent: Aug. 4, 2020

(54) VEHICLE GRILLE SHUTTER SYSTEM AND METHOD OF OPERATION

(71) Applicants: Gregory P Prior, Birmingham, MI (US); Paul D Netkowski, Gaines, MI (US); Mitchell S Zajac, Holt, MI (US)

(72) Inventors: Gregory P Prior, Birmingham, MI (US); Paul D Netkowski, Gaines, MI (US); Mitchell S Zajac, Holt, MI (US)

(73) Assignee: FCA US LLC, Auburn Hills, MI (US)

( * ) Notice: Subject to any disclaimer, the term of this patent is extended or adjusted under 35 U.S.C. 154(b) by 587 days.

(21) Appl. No.: 14/923,485

(22) Filed: Oct. 27, 2015

(65) Prior Publication Data

US 2017/0113539 A1    Apr. 27, 2017

(51) Int. Cl.
*B60K 11/08* (2006.01)
*B60K 11/04* (2006.01)

(52) U.S. Cl.
CPC ............ *B60K 11/085* (2013.01); *B60K 11/04* (2013.01); *B60Y 2300/52* (2013.01); *Y02T 10/52* (2013.01); *Y02T 10/88* (2013.01)

(58) Field of Classification Search
CPC .... B60K 11/085; B60K 11/04; B60H 1/3204; B60R 19/52
USPC ..................... 701/29.2, 49; 60/425; 454/152; 180/68.1; 137/12
See application file for complete search history.

(56) References Cited

U.S. PATENT DOCUMENTS

| | | | |
|---|---|---|---|
| 8,655,545 B2 | 2/2014 | Yu | |
| 2002/0166320 A1* | 11/2002 | Buscher | F01P 7/044 60/425 |
| 2013/0338870 A1* | 12/2013 | Farmer | B60K 11/085 701/29.2 |
| 2014/0039765 A1* | 2/2014 | Charnesky | F01P 7/10 701/49 |
| 2014/0094104 A1* | 4/2014 | Manhire | B60K 11/085 454/152 |
| 2015/0231962 A1* | 8/2015 | Ruppert | B60K 11/085 180/68.1 |
| 2015/0323138 A1* | 11/2015 | Cunningham | F17D 5/00 137/12 |

OTHER PUBLICATIONS

R134a System Pressure Chart, 2-page document, printed on Nov. 8, 2016.*

* cited by examiner

*Primary Examiner* — Alexander G Kalinowski
*Assistant Examiner* — Sanjeev Malhotra
(74) *Attorney, Agent, or Firm* — Ralph E Smith

(57) ABSTRACT

A system and method for controlling an active grille shutter system for a vehicle upon startup of an associated engine includes determining if flaps of the AGS system are in a closed position upon cold-startup of the vehicle; moving the flaps to the closed position if it is determined that the flaps are not in the closed position upon cold-startup of the vehicle; and maintaining the flaps in the closed position until an engine coolant temperature (ECT) reaches a predetermined temperature that initially overshoots a predetermined continuous ECT target associated with steady-state operation of the engine. The initial overshoot of the ECT during cold-startup is configured to rapidly raise an engine oil temperature (EOT) to a predetermined continuous EOT target thereby reducing viscosity of the engine oil during cold-startup operation and increasing fuel efficiency of the vehicle.

19 Claims, 3 Drawing Sheets

VEHICLE GRILLE SHUTTER SYSTEM AND METHOD OF OPERATION

FIELD

The present application relates generally to vehicles with active grille shutters and, more particularly, to control of active grille shutters for a vehicle during cold start.

BACKGROUND

In some vehicles, a grille shutter is located at the front of the vehicle and is configured to allow air to flow therethrough to cool the engine and/or underhood area of the vehicle. Some grille shutters are automated such that depending on the state of the vehicle, the flaps of the grille shutter can be open or closed. These grille shutters may be referred to as active grille shutter (AGS) systems. For example, when the vehicle is traveling at higher speeds, the flaps can be partially closed or fully closed to increase the aerodynamics of the vehicle. When the vehicle is moving at lower speeds or decelerating, the flaps can be opened to increase the airflow across the radiator. Further, the vehicles may include electronically controlled coolant circuit control devices such as electric thermostats (Estats) and coolant control valves (CCV) to enable controlled elevation of the vehicle fluid temperatures to improve engine operation efficiency. However, such controlled coolant circuit control devices increase vehicle cost, mass, and complexity. Accordingly, while such conventional coolant circuit control devices work for their intended purpose, it is desirable to provide an improved system with reduced complexity.

SUMMARY

According to one aspect of the invention, a method of controlling an active grille shutter (AGS) system for a vehicle upon startup is provided. In an exemplary implementation, the method includes determining if flaps of the AGS system are in a closed position upon cold-startup of the vehicle, moving the flaps to the closed position if the flaps are determined to not be in the closed position upon cold-startup of the vehicle, and maintaining the flaps in the closed position until an engine coolant temperature (ECT) reaches a predetermined temperature that initially overshoots a predetermined continuous ECT target associated with steady-state operation of the engine. The initial overshoot of the ECT during cold-startup is configured to rapidly raise an engine oil temperature (EOT) to a predetermined continuous EOT target associated with the steady-state operation of the engine thereby reducing viscosity of the engine oil during cold-startup operation and increase fuel efficiency of the vehicle.

According to another aspect of the invention, a system for controlling an active grille shutter (AGS) system for a vehicle upon startup is provided. In an exemplary implementation, the system includes a grille shutter having a plurality of flaps movable between an open position and a closed position, and a control module in signal communication with the grille shutter. The control module is configured to determine if the flaps are in the closed position upon a cold-startup of the vehicle, and to move the flaps to the closed position if the flaps are determined to not be in the closed position upon cold-startup. The control module is configured to maintain the flaps in the closed position until a vehicle engine coolant temperature (ECT) reaches a predetermined temperature that initially overshoots a predetermined continuous ECT target associated with steady-state operation of the engine. The initial overshoot of the ECT during cold-startup is configured to rapidly raise an engine oil temperature (EOT) to a predetermined continuous EOT target associated with the steady-state operation of the engine thereby reducing viscosity of the engine oil and increasing fuel efficiency of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
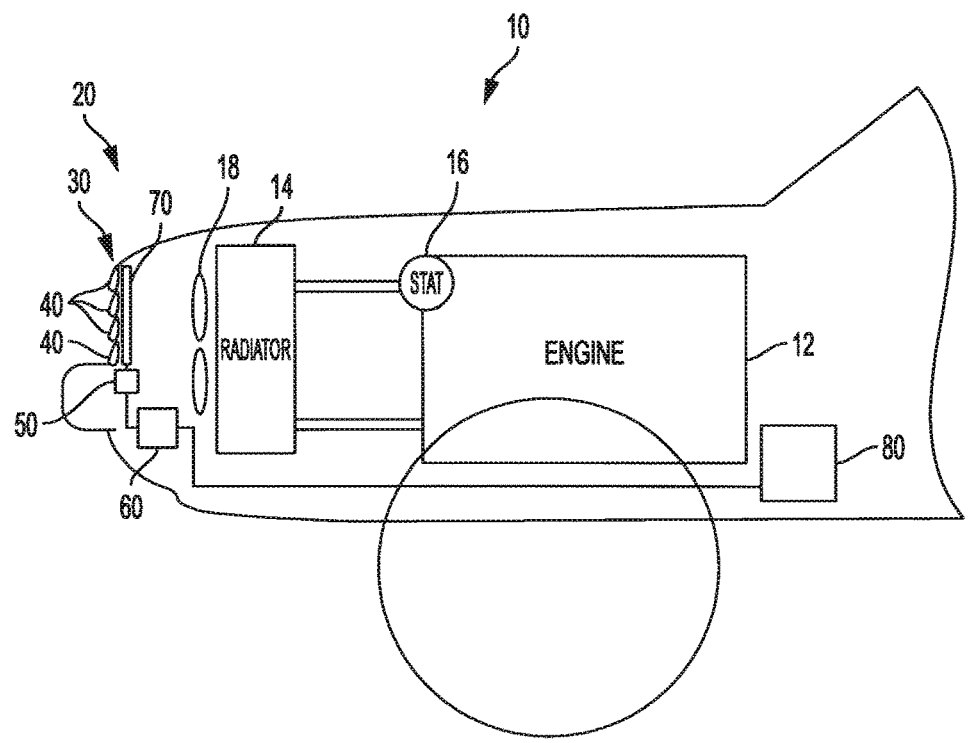
FIG. 1 is a schematic view of a vehicle having an exemplary active grille shutter system in a first position in accordance with the principles of the present disclosure.
Figure 2:
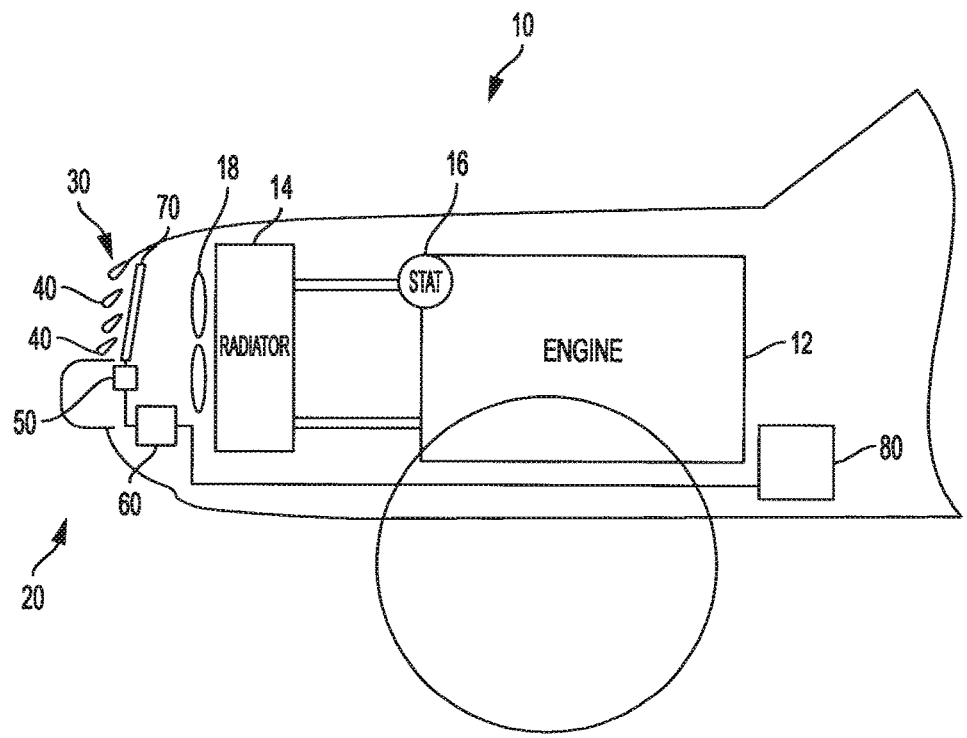
FIG. 2 is a schematic view of the vehicle shown in FIG. 1 with the active grille shutter system in a second position in accordance with the principles of the present disclosure.

With initial reference to FIGS. 1 and 2, an exemplary vehicle is illustrated and generally identified at reference numeral 10. Vehicle 10 generally includes an engine 12, a radiator 14, a thermostatic coolant control device or thermostat 16, a fan 18, and an active grille shutter (AGS) system 20. AGS system 20 generally includes a grille shutter 30 having a plurality of flaps 40, a motor 50, one or more links 70 that connect motor 50 to the grille shutter 30, and a control module 60, such as an AGS control module, that controls motor 50. In the illustrated implementation, AGS control module 60 is in signal communication with an engine control module 80 of the vehicle 10. Alternatively, control modules 60, 80 may be a single control module such as a powertrain control module.

As used herein, the term control module refers to an application specific integrated circuit (ASIC), an electronic circuit, a processor (shared, dedicated, or group) and memory that executes one or more software or firmware programs, a combinational logic circuit, and/or other suitable components/systems that provide the described functionality.

In the example implementation, AGS control module 60 is configured to receive instructions from engine control module 80 indicating an amount by which to open or close flaps 40 of grille shutter 30. The instruction can include a position to which flaps 40 are to be moved or an amount that flaps 40 are to be moved or rotated. AGS control module 60 provides a command to motor 50 indicating an amount by which to open or close flaps 40. In response to the command signal, motor 50 drives the one or more links 70 to increase or decrease the opening of grille shutter 30 by the amount indicated in the command. In the example implementation, motor 50 is an electric motor. However, motor 50 may be any suitable actuator that enables AGS system 20 to function as described herein.

Engine control module 80 is configured to determine the position to which flaps 40 are to be moved based on one or more parameters. For example, engine control module 80 can receive one or more of the following parameter values: an ambient temperature at grille shutter 30, an air conditioning system head pressure (ACP), an engine coolant temperature (ECT), a throttle position via a sensor (TPS), a manifold absolute pressure (MAP), an air charge temperature (ACT), a vehicle speed, and an elapsed time after vehicle start. However, one or more additional parameters may be used. Based on the received parameter values, engine control module 80 determines a position to which flaps 40 are to be moved. Engine control module 80 receives parameter values from any suitable source such as vehicle components and/or sensors, including AGS control module 60.

In some implementations, AGS control module 60 maintains a current position of flaps 40 and provides the current position of flaps 40 to engine control module 80. The AGS control module 60 can determine the position of flaps 40 in any suitable manner.

Based on the determined position of flaps 40 and the current position of flaps 40, engine control module 80 determines whether the position of flaps 40 needs to be adjusted, and if so, an amount by which to increase or decrease the opening of grille shutter 30. Once engine control module 80 determines the amount by which to increase or decrease the opening of grill shutter 30, engine control module 80 provides the amount to increase or decrease the opening of grille shutter 30 to AGS control module 60, which subsequently instructs motor 50 to adjust the position of flaps 40 in accordance with the determined amount.

In an example cold start operation, vehicle 10 is started and AGS control module 60 moves flaps 40 to a closed position if flaps 40 are not already in the closed position. Typical with some vehicle cold starts, the engine and radiator coolant temperature will be low, and the engine coolant temperature will subsequently begin to increase as engine 12 continues to operate. Once the engine coolant reaches a first predetermined temperature, thermostat 16 is opened to allow the engine coolant to flow to radiator 14, for example when engine 12 or other component reaches or is about to reach a predetermined operating temperature. Once the engine coolant reaches a second predetermined temperature, for example when approaching a continuous or steady-state engine operating temperature, flaps 40 are opened. Once the engine coolant reaches a third predetermined temperature, for example when the engine coolant reaches a continuous or steady-state engine operating temperature, fan 18 is turned on. The engine coolant is then maintained at or in proximity to the steady-state or continuous engine operating temperature target.

Figure 3:
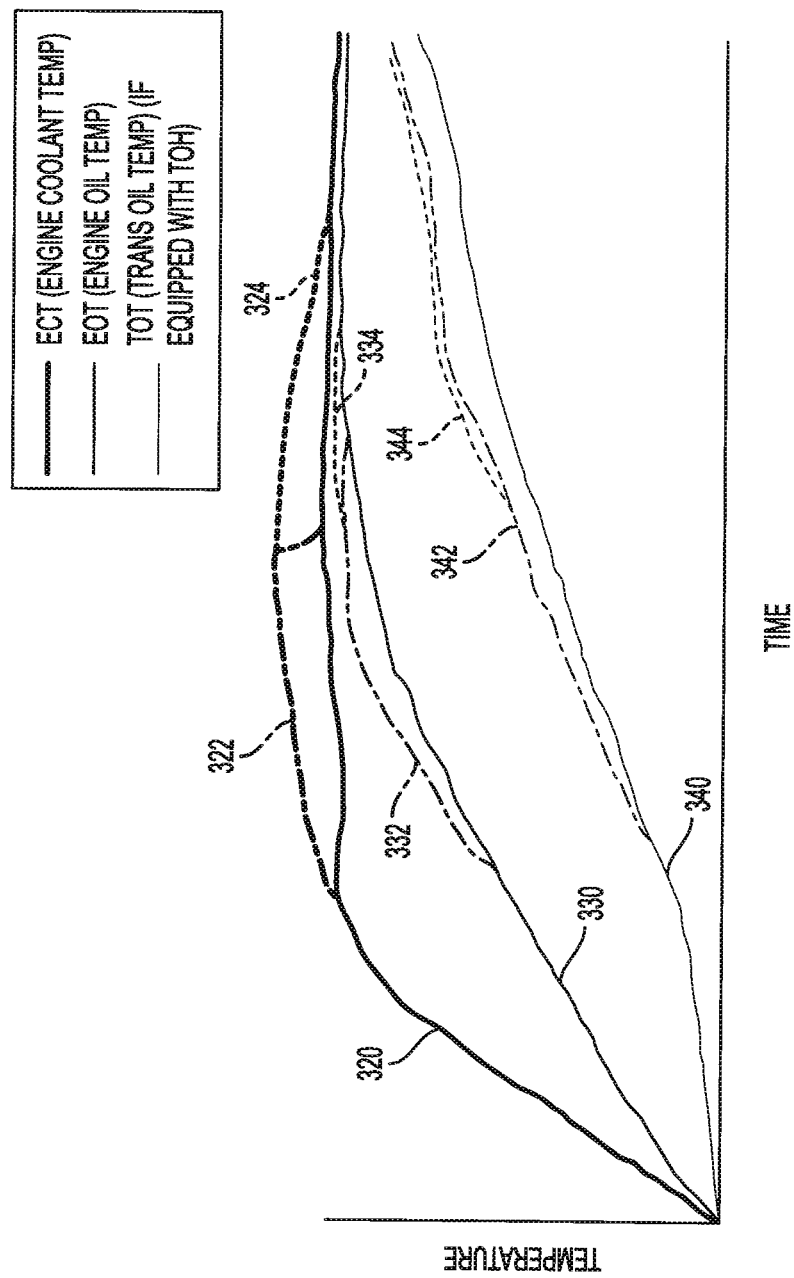
FIG. 3 is a graph plotting exemplary vehicle fluid temperatures over time in accordance with the principles of the present disclosure.

FIG. 3 illustrates an exemplary plot of fluid temperatures over time for a typical fixed AGS control compared to AGS system 20. Line 320 represents an engine coolant temperature (ECT), line 330 represents an engine oil temperature (EOT), and line 340 represents a transmission oil temperature (TOT) (typical of a vehicle equipped with a transmission oil heater system). Lines 320, 330, and 340 represent the temperature of their respective fluid if the AGS flaps are opened shortly after the thermostat is opened at the first predetermined temperature. In contrast, dashed lines 322, 332, and 342 respectively illustrate the temperature of the engine coolant, the engine oil, and the transmission oil when AGS system 20 is utilized and flaps 40 remain closed until the ECT reaches a predetermined temperature that initially overshoots the steady-state or predetermined continuous operating temperature.

As illustrated by the graph, the ECT warm-up rate initially overshoots or continues past initial opening of thermostat 16 by keeping flaps 40 closed for a predetermined time, thereby rapidly increasing the ECT (line 322) after cold startup (e.g., to approximately 115° C.). As shown, the initial overshoot temperature of the engine coolant overshoots a predetermined continuous ECT target (where line 320 substantially levels off horizontally, for example approximately 85° C.). This increase in ECT is then transferred to the engine oil and/or the transmission oil via direct or indirect heat exchange, thereby rapidly raising the EOT/TOT to a continuous EOT and/or TOT target configured to reduce viscosity of the engine oil and/or transmission oil.

Accordingly, as shown by dashed lines 332 and 342, the rapid warm-up continues during the controlled temperature overshoot for both the engine oil and the transmission oil as compared to the typical fixed AGS (as shown by lines 330, 340). This in turn more quickly or rapidly reduces the viscosity of the engine oil and/or transmission oil, which reduces frictional effects on bearings, oil pumps, etc., thereby increasing fuel efficiency.

Once flaps 40 are opened, the AGS system 20 may be operated under a known continuous temperature control strategy to return dashed lines 322, 332, and 342 respectively to lines 320, 330, and 340 to maintain engine fluids (e.g., oil) at target operating temperature to prolong the life of the fluid. Alternatively, as shown by lines 324, 334, and 344, AGS system 20 may transition to the continuous temperature control strategy over a period of time, which may result in a longer and more gradual temperature reduction until dotted lines 324, 334, 344 respectively reach lines 320, 330, 340.

Figure 4:
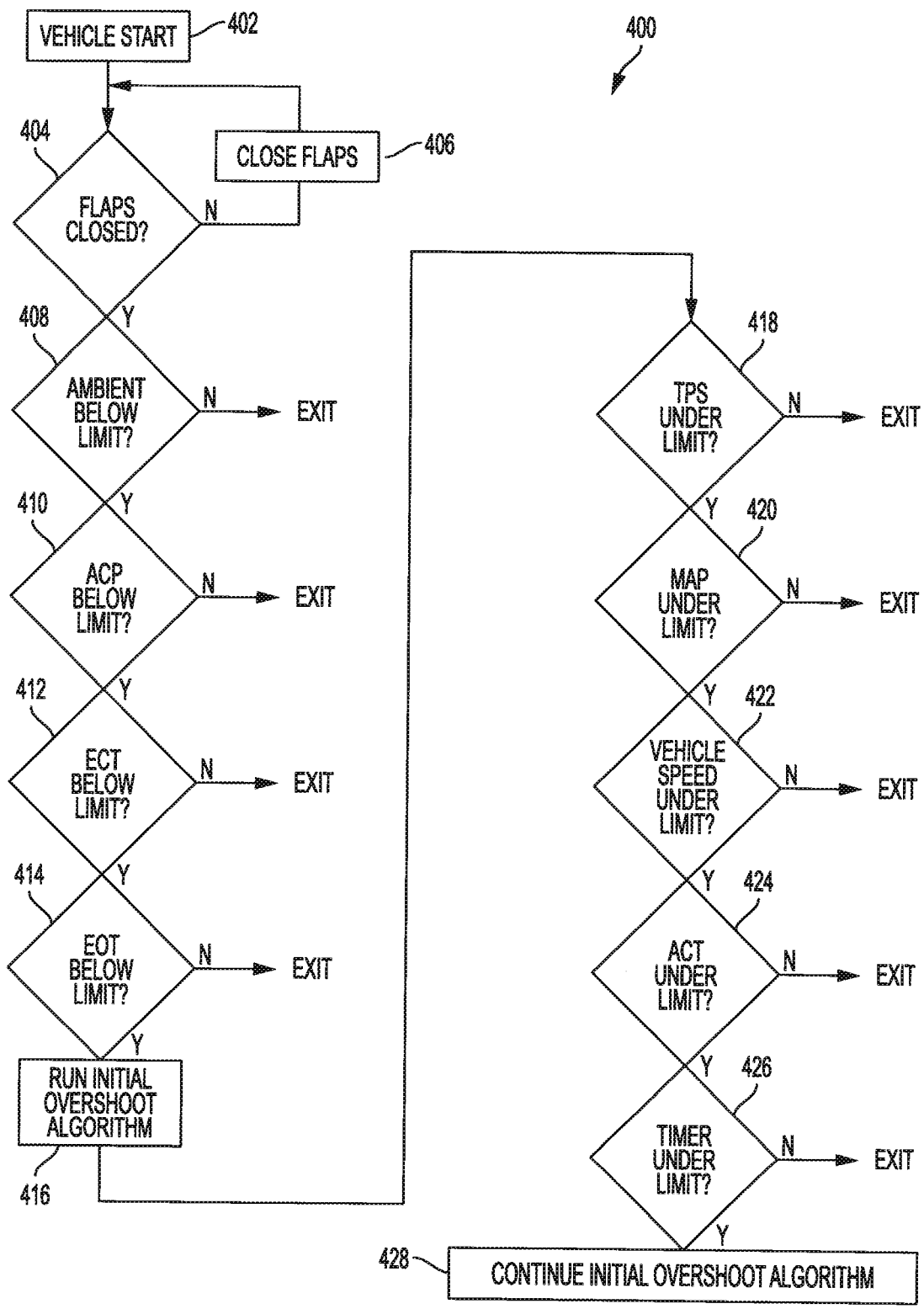
FIG. 4 is a flow diagram of an exemplary method of operating the active grille shutter system shown in FIGS. 1 and 2 in accordance with the principles of the present disclosure.

Referring now to FIG. 4, an example method 400 of operating vehicle 10 is illustrated. More specifically, method 400 provides a cold start control operation of vehicle 10 and AGS system 20. The control method is configured to elevate the operating temperature of engine 12 initially after a cold start by keeping grille shutter 30 closed until predetermined temperature limits are reached. This causes an initial overshoot of the engine coolant temperature (ECT), which more rapidly warms the engine/transmission oil to reduce viscosity, thereby increasing vehicle fuel efficiency without the need for electronic controlled thermostats or coolant control valves.

In the example method, vehicle 10 is started at step 402. At step 404, AGS control module 60 determines if flaps 40 are in the closed position. If no, at step 406, AGS control module 60 moves flaps 40 to the closed position and control returns to step 404. If yes, at step 408, control module 80 determines if the ambient temperature at or near grille shutter 30 is less than an ambient limit startup temperature. If no, control module 60 exits the method and further control of flaps 40 may commence. If yes, the control method proceeds to step 410.

At step 410, control module 80 determines if the vehicle air conditioning (AC) head pressure is below a predetermined pressure threshold. If no, control module 60 exits the method to thereby protect against high AC system pressures that may affect AC system durability. If yes, at step 412, control module 80 determines if the ECT is less than a predetermined startup temperature. If no, control module 60 exits the method to thereby protect vehicle 10 from a quick warmup during elevated temperature conditions such as high ambient grade climbs. If yes, the control method proceeds to step 414.

At step 414, control module 80 determines if the vehicle engine oil temperature (EOT) less than a predetermined startup temperature. If no, control module 60 exits the method to thereby protect vehicle 10 by establishing continuous targets for oil life. If yes, at step 416, control module 60 performs an initial overshoot control (as shown by line 322 in FIG. 3) by closing flaps 40 of AGS system 20, to initially overshoot the ECT above the predetermined continuous ECT target (e.g., where line 320 levels off horizontally).

At step 418, control module 80 determines if the vehicle throttle position sensor (TPS) reading is below a predetermined threshold of 50% open. If no, control module 60 exits the control to thereby lower engine coolant temperature for maximum engine power when high throttle has occurred. If yes, at step 420, control module 80 determines if the vehicle manifold absolute pressure (MAP) is under a predetermined threshold. If no, control module 60 exits the control to thereby provide for lower engine coolant temperature for maximum engine power when high manifold absolute pressure has occurred. If yes, the control method proceeds to step 422.

At step 422, control module 80 determines if the vehicle speed is below a predetermined threshold. If no, control module 60 exits the control to thereby provide for lower temperature for maximum power when a high vehicle speed has occurred. If yes, at step 424, control module 80 determines if the vehicle air charge temperature (ACT) is over a predetermined threshold temperature for a predetermined amount of time. If no, control module 60 exits the control to thereby provide for lower temperature for maximum power when a high air charge temperature has occurred. If yes, the control method proceeds to step 426.

At step 426, control module 80 determines if the time after the vehicle start is less than a predetermined threshold. If no, control module 60 exits the control to thereby prevent prolonged elevated engine temperature and reduced airflow operation after the initial startup. If yes, at step 428, control module 60 further performs the initial overshoot control. Once the EOT and/or TOT reaches a respective predetermined continuous target operating temperature, flaps 40 may be opened to return the ECT to predetermined continuous ECT target.

In one example implementation, the ambient limit startup temperature is between approximately 90° F. and approximately 100° F., the AC head pressure predetermined threshold is between approximately 1700 kPa and approximately 1800 kPa, the ECT predetermined startup temperature is between approximately 80° C. and approximately 90° C., the predetermined continuous ECT temperature target is between approximately 100° C. and approximately 110° C., the ECT initial overshoot temperature is between approximately 110° C. and approximately 120° C., the EOT predetermined startup temperature is between approximately 85° C. and approximately 95° C., the predetermined continuous EOT target is between approximately 100° C. and approximately 110° C., the throttle position sensor is between approximately 40% and approximately 60%, the MAP predetermined threshold is between approximately 35 kPa and approximately 55 kPa, the vehicle speed predetermined threshold is between approximately 50 mph and approximately 70 mph, the ACT predetermined threshold temperature is between approximately 30° C. and approximately 50° C., and the time after vehicle start predetermined threshold is between approximately fifteen minutes and approximately 25 minutes.

In another example implementation, the ambient limit startup temperature is between 90° F. and 100° F., the AC head pressure predetermined threshold is between 1700 kPa and 1800 kPa, the ECT predetermined startup temperature is between 80° C. and 90° C., the predetermined continuous ECT temperature target is between 100° C. and 110° C., the ECT initial overshoot temperature is between 110° C. and 120° C., the EOT predetermined startup temperature is between 85° C. and 95° C., the predetermined continuous EOT target is between 100° C. and 110° C., the throttle position sensor is between 40% and 60%, the MAP predetermined threshold is between 35 kPa and 55 kPa, the vehicle speed predetermined threshold is between 50 mph and 70 mph, the ACT predetermined threshold temperature is between 30° C. and 50° C., and the time after vehicle start predetermined threshold is between fifteen minutes and 25 minutes.

In yet another example implementation, the ambient limit startup temperature is approximately 95° F., the AC head pressure predetermined threshold is approximately 1722 kPa, the ECT predetermined startup temperature is approximately 85° C., the predetermined continuous ECT temperature target is approximately 105° C., the ECT initial overshoot temperature is approximately 115° C., the EOT predetermined startup temperature is approximately 90° C., the predetermined continuous EOT target is approximately 105° C., the throttle position sensor is approximately 50%, the MAP predetermined threshold is approximately 45 kPa, the vehicle speed predetermined threshold is approximately 60 mph, the ACT predetermined threshold temperature is approximately 40° C., and the time after vehicle start predetermined threshold is approximately twenty minutes.

In yet another example implementation, the ambient limit startup temperature is 95° F., the AC head pressure predetermined threshold is approximately 1722 kPa, the ECT predetermined startup temperature is 85° C., the predetermined continuous ECT temperature target is 105° C., the ECT initial overshoot temperature is 115° C., the EOT predetermined startup temperature is 90° C., the predetermined continuous EOT target is 105° C., the throttle position sensor is 50%, the MAP predetermined threshold is 45 kPa, the vehicle speed predetermined threshold is 60 mph, the ACT predetermined threshold temperature is 40° C., and the time after vehicle start predetermined threshold is twenty minutes.

Described herein are system and methods for increasing temperatures of a vehicle to improve fuel efficiency at a cold start such as where the powertrain is at or near ambient temperature or significantly lower than operating temperature. The operating temperature of the engine is elevated after a cold start by keeping the AGS closed until predetermined temperature limits are reached. This increases engine oil temperature to reduce viscosity, thereby increasing fuel efficiency of the vehicle. This initial elevation of engine oil temperature additionally provides for rapid heating of transmissions and rear axles on vehicles equipped with transmission or axle heat exchangers. By utilizing the AGS to achieve an initial elevated temperature, fuel efficiency can be improved without the added cost, mass, and complexity of additional devices such as electronic controlled thermostats and coolant control valves (stepper motor thermostatic devices).

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A method of controlling an active grille shutter (AGS) system for a vehicle upon startup of an engine of the vehicle, the method comprising:
   determining if flaps of the AGS system are in a closed position upon cold-startup of the vehicle;
   moving the flaps of the AGS system to the closed position if the flaps are determined to not be in the closed position upon cold-startup of the vehicle; and
   maintaining the flaps of the AGS system in the closed position until an engine coolant temperature (ECT) reaches a predetermined initial overshoot temperature that initially overshoots a predetermined continuous ECT target associated with steady-state operation of the engine;
   wherein the initial overshoot of the ECT during cold-startup is configured to rapidly raise an engine oil temperature (EOT) to a predetermined continuous EOT target associated with the steady-state operation of the engine thereby reducing viscosity of the engine oil during cold-startup operation and increasing fuel efficiency of the vehicle.

2. The method of claim 1, further comprising:
   moving the flaps of the AGS system to an open position to lower the ECT from the predetermined initial overshoot temperature to the predetermined continuous ECT target; and
   subsequently operating the AGS system under a continuous temperature control strategy to maintain the ECT at the predetermined continuous ECT target and the EOT at the predetermined continuous EOT target.

3. The method of claim 1, further comprising maintaining an engine thermostat in a closed position until the ECT reaches a second predetermined temperature, wherein the closed position of the thermostat is configured to prevent engine coolant from being supplied to a radiator and the second predetermined temperature is less than the predetermined temperature.

4. The method of claim 1, further comprising:
   determining if an ambient temperature proximate the flaps of the AGS system is less than an ambient limit startup temperature;
   determining if a vehicle air conditioning (AC) head pressure is below a predetermined AC head pressure threshold;
   determining if the ECT is below an ECT predetermined startup temperature;
   determining if the EOT is below an EOT predetermined startup temperature; and
   maintaining the flaps of the AGS system in the closed position if the ambient temperature is less than the ambient limit startup temperature, the AC head pressure is below the predetermined AC head pressure threshold, the ECT is below the ECT predetermined startup temperature, and the EOT is below the EOT predetermined startup temperature.

5. The method of claim 4, wherein the ambient limit startup temperature is between approximately 90° F. and approximately 100° F., the predetermined AC head pressure threshold is between approximately 1700 kPa and approximately 1800 kPa, the ECT predetermined startup temperature is between approximately 80° C. and approximately 90° C., and the EOT predetermined startup temperature is between approximately 85° C. and approximately 95° C.

6. The method of claim 1, further comprising:
   determining if a vehicle throttle position sensor (TPS) reading is below a predetermined TPS threshold;
   determining if a vehicle manifold absolute pressure (MAP) is under a predetermined MAP threshold;
   determining if a vehicle speed is below a predetermined vehicle speed threshold;
   determining if a vehicle air charge temperature (ACT) is over a predetermined ACT temperature threshold for a predetermined amount of time; and
   maintaining the flaps of the AGS system in the closed position if the TPS reading is below the predetermined TPS threshold, the MAP is under the predetermined MAP threshold, the vehicle speed is below the predetermined vehicle speed threshold, and the ACT is over the predetermined ACT temperature threshold for the predetermined amount of time.

7. The method of claim 6, wherein the predetermined TPS threshold is between approximately 40% and approximately 60%, the predetermined MAP threshold is between approximately 35 kPa and approximately 55 kPa, the predetermined vehicle speed temperature is between approximately 50 mph and approximately 70 mph, and the predetermined ACT temperature is between approximately 30° C. and approximately 50° C.

8. The method of claim 7, further comprising:
   determining if an amount of time after vehicle start is below a vehicle start time predetermined threshold; and
   maintaining the flaps of the AGS system in the closed position if the amount of time after vehicle start is below the vehicle start time predetermined threshold.

9. The method of claim 1, wherein the predetermined continuous ECT target is between approximately 100° C. and approximately 110° C., and the ECT initial overshoot predetermined temperature is between approximately 110° C. and approximately 120° C.

10. The method of claim 9, wherein the continuous EOT target is between approximately 100° C. and approximately 110° C.

11. A system for controlling an active grille shutter (AGS) system for a vehicle upon startup of an engine of the vehicle, the system comprising:
    a grille shutter having a plurality of flaps movable between an open position and a closed position; and
    a control module in signal communication with the grille shutter, the control module configured to determine if the flaps are in the closed position upon a cold-startup of the vehicle, and to move the flaps to the closed position if the flaps are determined to not be in the closed position upon cold-startup,
    wherein the control module is configured to maintain the plurality of flaps in the closed position until an engine coolant temperature (ECT) reaches a predetermined initial overshoot temperature that initially overshoots a predetermined continuous ECT target associated with steady-state operation of the engine, and wherein the initial overshoot of the ECT during cold-startup is configured to rapidly raise an engine oil temperature (EOT) to a continuous EOT target associated with the steady-state operation of the engine thereby reducing viscosity of the engine oil during cold-startup operation and increasing fuel efficiency of the vehicle.

12. The system of claim 11, wherein the control module is further configured to:
  move the flaps of the AGS system to the open position to lower the ECT from the predetermined initial overshoot temperature to the predetermined continuous ECT target; and
  subsequently operate the AGS system under a continuous temperature control strategy to maintain the ECT at the predetermined continuous ECT target and the EOT at the continuous EOT target.

13. The system of claim 11, wherein the control module is configured to maintain an engine thermostat in a closed position until the ECT reaches a second predetermined temperature, the closed position of the thermostat configured to prevent the engine coolant from being supplied to a radiator, wherein the second predetermined temperature is less than the predetermined temperature.

14. The system of claim 11, wherein the control module is further configured to:
  determine if an ambient temperature proximate the flaps is less than an ambient limit startup temperature;
  determine if the vehicle AC head pressure is below a predetermined AC head pressure threshold;
  determine if the ECT is below an ECT predetermined startup temperature;
  determine if the EOT is below an EOT predetermined startup temperature; and
  maintain the flaps in the closed position if the ambient temperature is less than the ambient limit startup temperature, the ACT is below the predetermined threshold, the ECT is below the ECT predetermined startup temperature, the EOT is below the EOT predetermined startup temperature.

15. The system of claim 14, wherein the ambient limit startup temperature is between approximately 90° F. and approximately 100° F., the predetermined AC head pressure threshold is between approximately 1700 kPa and approximately 1800 kPa, the ECT predetermined startup temperature is between approximately 80° C. and approximately 90° C., and the EOT predetermined startup temperature is between approximately 85° C. and approximately 95° C.

16. The system of claim 11, wherein the control module is further configured to:
  determine if a vehicle throttle position sensor (TPS) reading is below a predetermined TPS threshold;
  determine if a vehicle manifold absolute pressure (MAP) is under a predetermined MAP threshold;
  determine if a vehicle speed is below a predetermined vehicle speed threshold;
  determine if a vehicle air charge temperature (ACT) is over a predetermined ACT temperature threshold for a predetermined amount of time; and
  maintain the flaps in the closed position if the TPS reading is below the predetermined TPS threshold, the MAP is under the predetermined MAP threshold, the vehicle speed is below the predetermined vehicle speed threshold, and the ACT is over the predetermined ACT temperature threshold for the predetermined amount of time.

17. The system of claim 16, wherein the predetermined TPS threshold is between approximately 40% and approximately 60%, the predetermined MAP threshold is between approximately 35 kPa and approximately 55 kPa, the predetermined vehicle speed temperature is between approximately 50 mph and approximately 70 mph, and the predetermined ACT temperature is between approximately 30° C. and approximately 50° C.

18. The system of claim 17, wherein the control module is further configured to:
  determine if an amount of time after vehicle start is below a vehicle start time predetermined threshold; and
  maintain the flaps in the closed position if the amount of time after vehicle start is below the vehicle start time predetermined threshold.

19. The system of claim 11, wherein the predetermined continuous ECT target is between approximately 100° C. and approximately 110° C., and the ECT initial overshoot predetermined temperature is between approximately 110° C. and approximately 120° C.

* * * * *